US007995726B2

(12) United States Patent
Bedingfield

(10) Patent No.: US 7,995,726 B2
(45) Date of Patent: Aug. 9, 2011

(54) SYSTEM AND METHOD FOR MONITORING INCOMING COMMUNICATIONS TO A TELECOMMUNICATIONS DEVICE

(75) Inventor: James C. Bedingfield, Lilburn, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1167 days.

(21) Appl. No.: 11/693,697

(22) Filed: Mar. 29, 2007

(65) Prior Publication Data

US 2007/0206750 A1 Sep. 6, 2007

Related U.S. Application Data

(63) Continuation of application No. 10/666,059, filed on Sep. 18, 2003, now Pat. No. 7,203,293, which is a continuation of application No. 09/742,765, filed on Dec. 20, 2000, now Pat. No. 6,665,388.

(51) Int. Cl.
*H04M 1/56* (2006.01)
*H04L 12/56* (2006.01)
*H04L 12/64* (2006.01)

(52) U.S. Cl. .............. 379/142.01; 379/207.15; 379/245; 379/247

(58) Field of Classification Search .............. 379/88.19, 379/88.2, 88.21, 93.17, 93.23, 142.01, 142.04, 379/142.05, 142.07, 245, 247, 207.13, 230, 379/207.15, 221.09; 370/352, 356
See application file for complete search history.

(56) References Cited

U.S. PATENT DOCUMENTS

| 5,724,412 | A  | * | 3/1998 | Srinivasan | 379/93.23 |
| 5,809,128 | A  | * | 9/1998 | McMullin | 379/215.01 |
| 6,278,773 | B1 | * | 8/2001 | Perlman et al. | 379/93.23 |
| 6,282,275 | B1 | * | 8/2001 | Gurbani et al. | 379/142.06 |
| 6,430,289 | B1 | * | 8/2002 | Liffick | 370/352 |

* cited by examiner

*Primary Examiner* — Binh K Tieu
(74) *Attorney, Agent, or Firm* — Parks IP Law LLC; Jennifer P. Medlin, Esq.

(57) ABSTRACT

A system for notifying an Internet-accessible device of a communication placed from a first telecommunications device to a second telecommunications device by a calling party is disclosed. The system includes a switch and a node in communication with the switch. The switch is for detecting the communication. The node is configured for communication with the Internet-accessible device and includes a first module and a second module. The first module is for determining information about the calling party. The second module is for determining information about the Internet-accessible device.

20 Claims, 6 Drawing Sheets

| To | From | Name | Date | Time |
|---|---|---|---|---|
| 7709257666 | 7709453211 | JONES OSCAR | 02/20/00 | 08:14 |
| 7709257666 | 4043322122 | SMITH BROTHERS | 02/20/00 | 08:15 |
| Call Log | Disabled | | 02/20/00 | 08:16 |
| Call Log | Enabled | | 02/22/00 | 06:00 |
| 7709257666 | 6789101112 | Effie Waddell | 02/22/00 | 06:30 |
| 7709257666 | 7709453211 | JONES OSCAR | 02/22/00 | 08:22 |
| 7709257666 | 3206953079 | BROWNS VALL, MN | 02/25/00 | 18:24 |
| 7709257666 | 4045610307 | Mom and Dad | 02/25/00 | 07:12 |
| 7709257666 | 4043322122 | SMITH BROTHERS | 02/25/00 | 08:14 |

SYSTEM AND METHOD FOR MONITORING INCOMING COMMUNICATIONS TO A TELECOMMUNICATIONS DEVICE

CROSS-REFERENCE TO RELATED APPLICATIONS

This application is a continuation of U.S. patent application Ser. No. 10/666,059, filed Sep. 18, 2003 which is a continuation of U.S. patent application Ser. No. 09/742,765, filed Dec. 20, 2000 and is hereby incorporated by reference. The present application claims priority to application Ser. Nos. 09/742,765 and 10/666,059 which have issued as U.S. Pat. Nos. 6,665,388 and 7,203,293.

STATEMENT REGARDING FEDERALLY SPONSORED RESEARCH AND DEVELOPMENT

Not Applicable.

BACKGROUND OF INVENTION

The present invention relates generally to communications and, more particularly, to systems and methods for monitoring incoming communications to a telecommunications device.

Due to the proliferation of the Internet, the World Wide Web and user-friendly web browsers, millions of personal computer (PC) users have easy access to a great quantity of information and documents from around the world. Internet infrastructures are largely land-based, transmitting data over digital links and analog lines. Accordingly, all that is required for a typical PC user to connect to the Internet is a telephone line, a modem, and an Internet Service Provider (ISP), through which connection to the Internet is provided. Many, if not most, home PC users, however, have only one telephone line to their residential premises. Therefore, when the home PC user is connected to the Internet via the single telephone tine, the telephone line is not capable of receiving incoming calls to the home PC user's residential premises. Thus, if the home PC user receives an incoming call from a calling party during the course of an Internet session, the incoming call is not completed and the calling party receives a busy signal. Moreover, conventional call-waiting services cannot remedy this problem because conventional call-waiting services must be disabled during an Internet session due to the fact that the conventional call-waiting signal would disrupt data transfer over the Internet via the single telephone line to the residential premises.

One solution to alleviate this problem are so-called "Internet call-waiting" (ICW) services. These services allow home Internet users to be notified of incoming calls while connected to the Internet. According to known ICW services, the home Internet user, after being notified of the incoming call, and sometimes even the name of the calling party, is provided the opportunity to disconnect from the Internet and accept the incoming call or remain connected to the Internet by rejecting the incoming call.

Another solution that many home PC users are pursuing is simply to install separate communications lines: one for their home PC and the other for incoming and outgoing telephone communications. The communication line for their PC may be another telephone line (a so-called "dial-up" connection) or it maybe a more direct data communications link such as an ADSL (asymmetric digital subscriber line) link or an ISDN (integrated digital services network) link. With any such two-line configuration, home PC users have the luxury of always being connected to the telephone network for receiving and transmitting telephone communications New inconveniences arise, however, for many home PC users with a two-line configuration. Significantly, for a home PC user who subscribes to a caller ID service whereby the name and telephone number of a calling party are displayed on a visual display unit associated telephone line/device, when the home PC user receives an incoming call during an Internet session, the PC user cannot easily access the visual display unit in enough time to answer the incoming call after viewing the displayed name of the calling party unless the visual display unit is in extremely close proximity to the home PC user's PC. This dilemma is especially vexing for residential premises in which the home PC and telephone arc located in separate rooms or on separate floors.

Accordingly, there exists a need for a manner in which the name and telephone number of panics calling on a separate line may be revealed to home PC users connected to the Internet without the home PC user having to leave the confines of their PC environment.

SUMMARY OF THE INVENTION

The present invention is directed to a method for monitoring incoming communications to a telecommunications device. According to one embodiment, the method includes detecting an incoming communication on a first communications link to the telecommunications device, wherein the incoming communication is from a calling party. The method further includes retrieving information regarding to the calling party in response to detection of the incoming communication, and sending a message to a data communications device via a second communications link. The message contains the information regarding the calling party.

Detection of the incoming communication to the telecommunications device may be performed by a signal switching point (SSP) switch provisioned with a terminating attempt trigger specific to the service. When the SSP switch detects the incoming communication, it may send a message to a first service control point (SCP). The first service control point may retrieve information regarding the party placing the incoming communication. This information maybe sent to a second SCP which, upon receiving the information from the first SCP, may retrieve an address for a data communications device, such as a personal computer (PC), and send the information to the data communications device at the retrieved address. The address may be an internet protocol (IP) address, and the message maybe sent to the data communications device via a network employing, for example, the transport control protocol/internet protocol (TCP/IP) suite of communications protocols to route packets of data. The data communications device may then display the information regarding the calling party to a user of the data communications device.

According to another embodiment, the present invention is also directed to a system for monitoring incoming communications to a telecommunications device. According to one embodiment, the system includes a switch and a service control point in communication with each other. The switch is for detecting an incoming communication to the telecommunications device from a calling party, wherein the switch is in communication with the telecommunications device by a first communications link. The service control point is for receiving a first message from the switch regarding detection of the incoming communication and for sending a second message to a data communications device, the second message containing information regarding the calling party, wherein the service control point is in communications with the data communications device by a second communications link.

Advantageously, embodiments of the present invention allow a user of the data communications device, such as a PC, to be notified of incoming communications to the telecommunications device, such as a remote telephone, without having to leave the environment of the PC. Consequently, a PC-user, white connected to the AIN, such as through the TCP/IP network, may monitor incoming calls to a remote telephone. These and other benefits of the invention will be apparent from the detailed description hereinbelow.

BRIEF DESCRIPTION OF THE DRAWINGS

For the present invention to be clearly understood and readily practiced, the present invention will be described in conjunction with the following figures, wherein:

FIG. 2 is a block diagram of a system according to one embodiment of the

DETAILED DESCRIPTION OF THE PRESENT INVENTION

Figure 1:
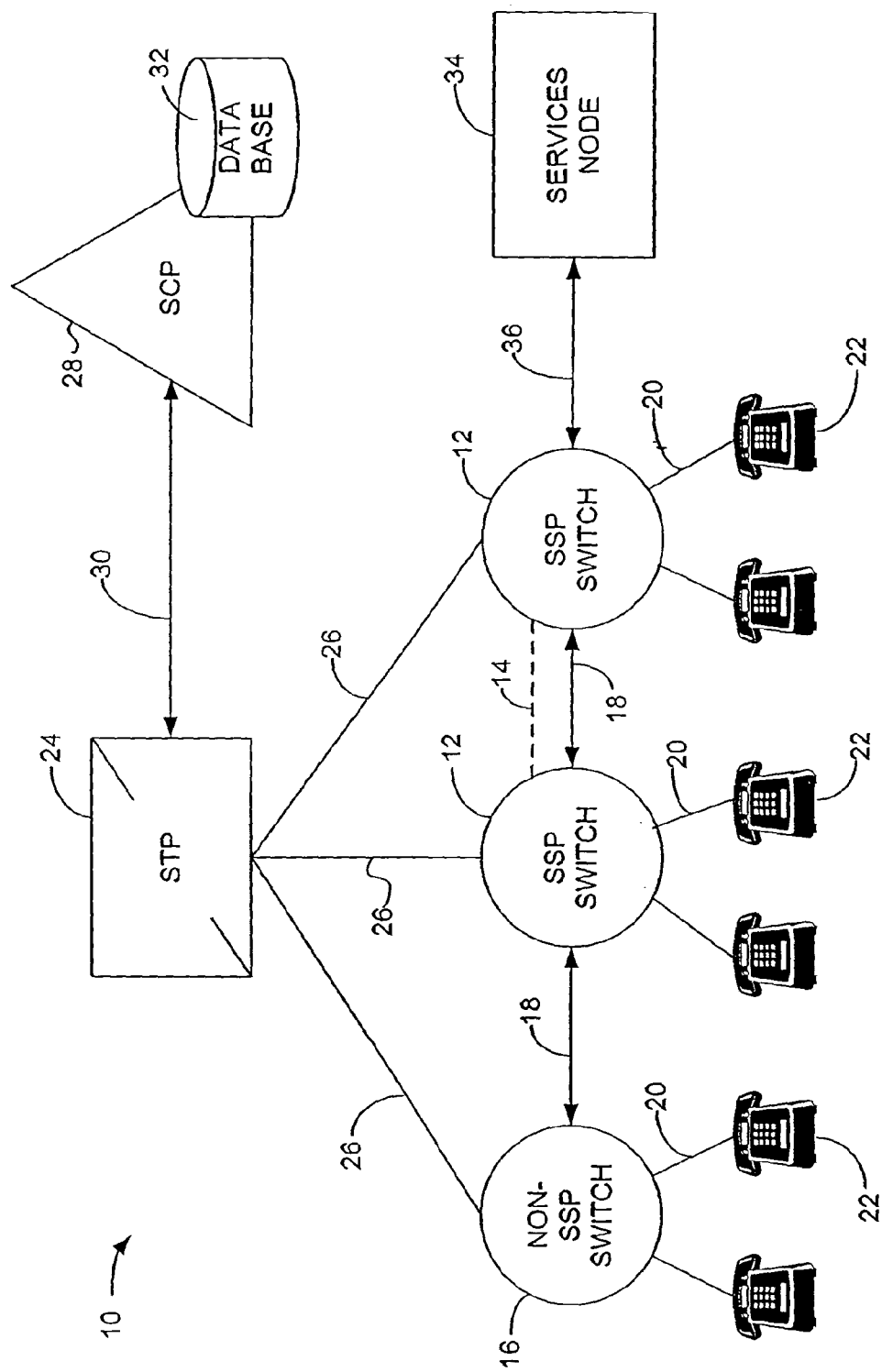
FIG. 1 is a block diagram of an Advanced Intelligent Network (AIN) for integration with a public switched telephone network.

It is to be understood that the figures and descriptions of the present invention have been simplified to illustrate elements that are relevant for a clear understanding of the present invention, while eliminating, for purposes of clarity, other elements of a communications network. For example, certain operating system details and modules of certain of the intelligent platforms of the network are not described herein. Those of ordinary skill in the art will recognize, however, that these and other elements may be desirable in a typical communications network. However, because such elements are well known in the art, and because they do not facilitate a better understanding of the present invention, a discussion of such elements is not provided herein.

The term "calling party" is used herein generally to refer to the person or device that initiates a telecommunication. The calling party may also be referred to herein as "caller," In some cases, the calling party may not be a person, but may be a device such as a facsimile machine, an answering service, a modem, etc. The term "called party" is used herein generally to refer to the person or device that answers or responds to the call or communication. The term "communication" is used herein to include all messages or calls that may be exchanged between a calling party and a called party, including voice, data and video messages. The term "communication" is used synonymously herein with the term "call" unless a distinction is noted. The term "subscriber" is used herein to generally refer to a subscriber of the described telecommunications service. The term "Internet" refers to both the Internet and an intranet, unless a distinction is noted. Similarly, the term "Internet-accessible device" refers to a data communications device that has the capability to access the Internet or an intranet.

The present invention is directed, according to one embodiment, to a system and method by which users of an Internet-accessible device, such as a personal computer (PC) with a dial-up or dedicated data link, maybe displayed the name and/or directory number of a party placing an incoming communication to a telecommunications device associated with the user on a telephone line that is separate from the line for the Internet-accessible device. Accordingly, the PC user, i.e., the subscriber of the telecommunications service, need not leave the confines of their PC environment to monitor incoming calls to a telecommunications device associated with the PC user, which may or may not be proximate to the subscriber during an Internet session.

According to one embodiment, the system utilizes the intelligent functionality of an Advanced Intelligent Network (AIN). The AIN is a network used in conjunction with a conventional telephone network, such as the public switched telephone network (PSTN), to provide enhanced voice, video and data services and dynamic routing capabilities using two different networks. The actual voice call is transmitted over a circuit-switched network, but the signaling is done on a separate packet-switched network. Before describing details of the system of the present invention, a description of the AIN is therefore provided.

FIG. 1 is a block diagram of an Advanced Intelligent Network (AIN) 10 for integration with the public switched telephone network (PSTN). The AIN 10 may be employed by a Local Exchange Carrier (LEC) servicing a Local Access and Transport Area (LATA) of the PSTN, and maybe utilized by the LEC to allow the LEC to provide call processing features and services that are not embedded within conventional switching circuits of the PSTN.

A typical LEC includes a number of central office (CO) switches for interconnecting customer premises terminating equipment with the P5TN. For an LEC including the AIN 10 as illustrated in FIG. 1, the central office switches may be provided as Service Switching Points (SSP) switches 12. The dashed line 14 between the SSP switches 12 indicates that the number of SSP switches 12 in the AN 10 may vary depending on the particular requirements of the AN 10, The AN 10 may also include a non-SSP switch 16. The difference between the SSP switches 12 and the non-SSP switch 16 is that the SSP switches 12 provide intelligent network functionality. Interconnecting the SSP switches 12 and the non-SSP switch 16 are communication links 18 which may be, for example, trunk circuits.

Each SSP switch 12 and non-SSP switch 16 has a number of subscriber lines 20 connected thereto. The subscriber lines 20 may be, for example, conventional twisted pair loop circuits connected between the switches 12, 16 and the telephone drops for the customer premises, or the subscriber lines 20 may be trunk circuits, such as T-1 trunk circuits. Typically, the number of subscriber lines 20 connected to each switch 12, 16 on the order often thousand to one hundred thousand lines. Each of the subscriber lines 20 is connected to a terminating piece of customer premises equipment, represented in FIG. 1 by the landline telephones 22. Alternatively, the terminating equipment may be, for example, a telecopier, a personal computer, a modem, or a private branch exchange (PBX) switching system.

For the AIN 10 illustrated in FIG. 1, each SSP switch 12 and the non-SSP switch 16 is connected to a signal transfer point (STP) 24 via a communication link 26. The communication link 26 may employ, for example, an SS7 switching protocol. The STP 24 may be a multi-port high speed packet switch that is programmed to respond to the routing information in the appropriate layer of the switching protocol, and route the data packets to their intended destination.

One of the intended destinations of the data packets from the STP 24 is a service control point (SCP) 28. The STP 24 is in communication with the SCP 28 via a communication link 30, which may also employ the SS7 switching protocol. The SCP 28 may be an intelligent database server such as, for example, an Intelligent Network Service Control Point available from Lucent Technologies Inc., Murray Hill, N.J., and may have associated with it a network database 32 for storing network data. The intelligent functionality of the SCP 28 maybe realized by application programs, such as Service Program Applications (SPA), which are run by the SCP 28. The SCP 28 is normally employed to implement high volume routing services, such as call forwarding and 800 number translation and routing. The SCP 28 may also be used for maintenance of and providing access to the network databases for authorization of billing, such as credit card validations. In addition, another of the functions of the SCP 28 is maintenance of the network database 32, which may store subscriber information, such as subscriber call management profiles, used in providing enhanced calling services. Such enhanced calling services may include call return, calling name, call forwarding, call screening and blocking, in addition to many other such services.

The AIN 10 illustrated in FIG. 1 also includes services node (SN) 34. The SN 34 may be, for example, a Compact Services Node (CSN) available from Lucent Technologies Inc., Murray Hill, N.J., although the SN available 34 may be any other AIN-compliant SN such as, for example, an AIN/IP (Intelligent Peripheral) SN from Nortel Networks Corp., Montreal, Quebec. The SN 34 may be connected to one or more of the SSP switches 12 via a communications link 36 which may be, for example, an Integrated Service Digital Network (ISDN) including BRI (Basic Rate Interface) or PRI (Primary Rate Interface) lines. According to other embodiments, the communications link 36 may be, for example, a T-I trunk circuit.

The SN 34 may be used primarily when some enhanced feature or service is needed that requires an audio connection to the call such as, for example, the call return and calling name services, or when transfer of a significant amount of data to a subscriber over a switched connection during or following a call is required. Similar to the SCP 28, the intelligent functionality of the SN 34 maybe realized by program applications executable by the SN 34.

In order to keep the processing of data and calls as simple as possible at the switches, such as at the SSP switches 12, a set of triggers may be defined at the SSP switches 12 for each call. A trigger in an AIN is an event associated with a particular subscriber line 20 that generates a data packet to be sent from the SSP switch 12 servicing the particular subscriber line 20 to the SCP 28 via the STP 24. The triggers may be originating triggers for calls originating from the subscriber premises or terminating triggers for calls terminating at the subscriber premises. A trigger causes a message in the form of a query to be sent from the SSP switch 12 to the SCP 28. The SCP 28 in turn interrogates the database 32 to determine whether some customized call feature or enhanced service should be implemented for the particular call, or whether conventional dial-up telephone service should be provided. The results of the database inquiry are sent back from the SCP 28 to the SSP switch 12 via the SW 24. The return packet includes instructions to the SSP switch 12 as to how to process the call. The instructions may be to take some special action as a result of a customized calling service or enhanced feature. For example, for an enhanced calling feature requiring the capabilities of the SN 34, the return message from the SCP 28 may include instructions for the SSP switch 12 to route the call to the SN 34. In addition, the return message from the SCP 28 may simply be an indication that there is no entry in the database 32 that indicates anything other than conventional telephone service should be provided for the call. The query and return messages may be formatted, for example, according to conventional SS7 TCAP (Transaction Capabilities Application Part) formats. U.S. Pat. No. 5,438, 568, which is incorporated herein by reference, discloses additional details regarding the functioning of an AIN 10.

The AIN 10 illustrated in FIG. 1 includes only one STP 24, one SCP 28, one network database 32, and one SN 34, although the AIN 10 may further include an additional number of these components as well as other network components which are not included in FIG. 1 for purposes of clarity. For example, the AIN 10 may additionally include redundant STPs and STPs to take over if the STP 24 or the SCP 28 should fail. In addition, the MN 10 may include an Automatic Electronic Switching System (AESS) Network Access Point (NAP) in communication with the STP 24, which may be programmed to detect the trigger conditions. Further, the AIN 10 may include regional STPs and regional SCPs in communication with, for example, the local STP 24, for routing and servicing calls between different LECs.

Figure 2:
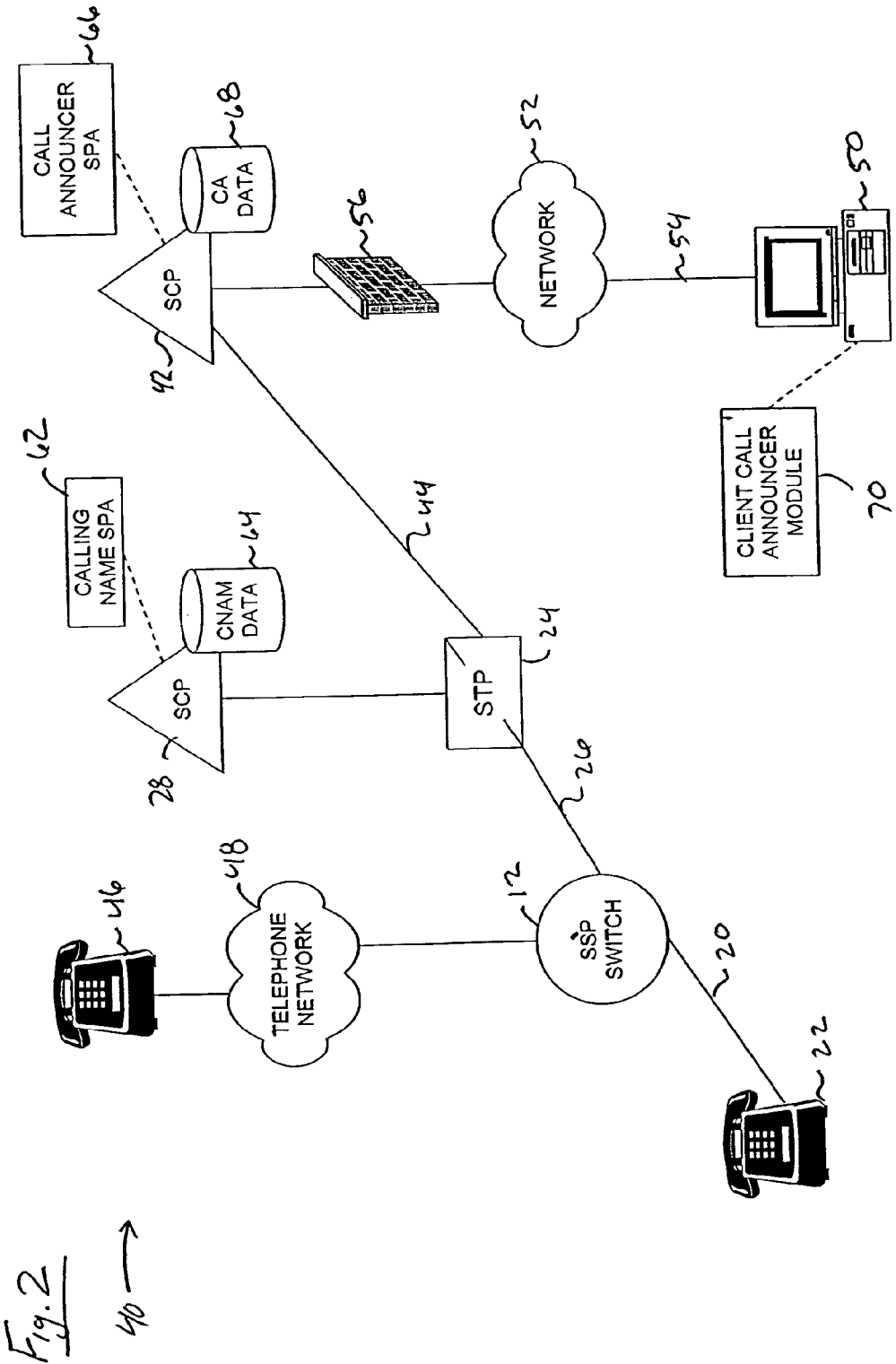

As discussed hereinbefore, the present invention is directed, according to one embodiment, to a system by which a subscriber, while accessing, for example, the Internet from an Internet-accessible device may be displayed the name and/or directory number of a party placing an incoming communication to a remote telecommunications device associated with the subscriber on a telephone line separate from the line for the Internet-accessible device. FIG. 2 is a diagram of a system 40 according to one such embodiment. The system 40 includes portions of the AIN 10 illustrated in FIG. 1 including an SSP switch 12, an SW 24, and an SCP 28. For purposes of clarity, other elements of the AIN 10 are not shown in FIG. 2. In addition, as described further hereinbelow, the system 40 may include a second SC? 42 in communication with the STP 24 via a communications link 44. The SCP 42 and the communications link 44 may be similar to the SCP 28 and the communications link 30 respectively described hereinbefore in The calling party may place a communication from the telecommunications device 46 to the subscriber at the telecommunications device 22 via the telephone network 48. The telephone network 48 may include, individually or in combination, a public switched telephone network (PSTN), a plain old telephone service (POTS) network, or a wireless telephone network.

The subscriber, while connected to, for example, the Internet or an intranet, by the data communications device 50, may be displayed information regarding the calling party on a monitor of the device 50. As illustrated in FIG. 2, the data communications device 50 maybe in communication with the second SCP 42 via a network 52. The network 52 may employ, for example, the TCP/IP suite of communications protocols to route packets of data between various nodes of the network 52. The network 52 may include the Internet or an intranet. The data communications device 50 maybe any device capable of receiving and sending data via the network 52 such as, for example, a personal computer (PC) having web browsing software. The device 50 maybe in communication with the network 52 via a communications link 54, which may include, for example, a dial-up communications link, a cable modem link, an ADSL link, or an ISDN link. Additionally, the system 40 may also include a firewall 56 to provide security for communications between the SCP 42 and the device 50.

According to one embodiment, the first SCP 28 may include a calling name SPA 62 and an associated calling name (CNAM) database 64 and the second SCP 42 may include a call announcer SPA 66 and a call announcer (CA) database 68. (Hereinafter, the first SCP 28 is referred to as the calling name or CNAM SCP 28 and the second SCP 42 is referred to as the call announcer or CA SCP 42.) The intelligent functionality of the SPAs 62, 66, in conjunction with the data maintained in the databases 64, 68, may be used to provide the calling name feature of the present invention, as described further hereinbelow. The CNAM database 64 may include, for example, the names and directory numbers of subscribers and non-subscribers to the network. The CA database 68 may include, for example, the routing address, such as the IP address, of the device 50. The address of the device 50 may be a permanent address or a variable address, such as for dial-up connections. Where the routing address of the device is variable, the address may be communicated to the CS SCP 42 when the device 50 establishes a connection with the network 52. When the address of the device 50 is permanent (such as for a cable modem link, an ADSL link, or an ISDN link), the CA database 68 may be provisioned with the address of the device 50 upon subscription to the service.

The SPAs 62, 66 may be implemented as software code to be executed by the respective SCPs 28, 42 using any type of computer instruction type suitable such as, for example, microcode, and may be stored in, for example, an electrically erasable programmable read only memory (EEPROM), or can be configured into the logic of the SCPs 28, 42. According to another embodiment, the SPAs 62, 66 may be implemented as software code to be executed by the SCPs 28, 42 using any suitable computer language such as, for example, Java, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

In addition, the data communications device 50 may include a client call announcer module 70. The client call announcer module 70 may monitor the data communications device 50 for an active connection with the network 52. If the client call announcer module 70 detects such a connection, the client announcer module 70 may send a message to the CA SCP 42 via the network 52 to that effect. In addition, for a dial-up connection, the client call announcer module 70 may send the address (such as the IP address) for the device 50 for the particular Internet-session. Moreover, as described further hereinbelow, the client call announcer module 70 may display on the monitor of the device 50 a message identifying the calling party for an incoming call to the telecommunications device 22. The client call announcer module may also tog the incoming call, as described further hereinbelow. In addition, according to one embodiment, the client call announcer may provide an audible indication to the subscriber of an incoming communication to the remote telecommunications device 22.

The client call announcer module 70 may be implemented as software code to be executed by the device 50 using any type of computer instruction type suitable such as, for example, microcode, and may be stored in, for example, an electrically erasable programmable read only memory (EEPROM), or can be configured into the logic of the device 50. According to another embodiment, the module 70 may be implemented as software code to be executed by the device 50 using any suitable computer language such as, for example, Java, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

Figures 3, 4:
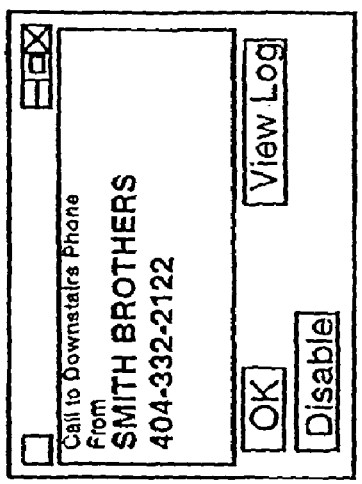
FIG. 3 is a diagram of a display that may be displayed to a subscriber to identify an incoming caller to a remote telecommunications device according to one embodiment of the present invention.
FIG. 4 is a diagram of a log of incoming calls to a remote telecommunications device that may be displayed to a subscriber according to one embodiment of the present invention.

An example of a visual display of the calling party information that the call announcer module 70 may display on the monitor of the device 50 is provided at FIG. 3. The display may be generated according to a conventional pop-up window or in a web browser application. Displaying the calling party information in a web browser application may be beneficial to permit transfer of the CNAM data though the firewall 56, such as where the device 50 is part of a corporate network, such as an intranet.

In addition, an example of a call log that the call announcer module 70 may display is provided at FIG. 4. As can be seen in FIGS. 3 and 4, the client call announcer 70 may permit the subscriber to disable/enable the calling name service The disable/enable events may be also be logged by the client call announcer module 70. According to one embodiment of the present invention, the log generated by the client call announcer module 70 may be editable using, for example, a text editor or word processing application. In addition, the log maybe printed or saved into a format accessible by, for example, a spreadsheet, contact manager, or database application.

For the embodiment illustrated in FIG. 2, the system 40 includes two SCPs (the CNAM SCP 28 and the CA SCP 42). According to other embodiments of the present invention, the CNAM SPA 62 and the CA SPA 66 may reside on a single SCP that is in communication with both the SSP switch 12 and the device 50. According to other embodiments of the present invention, either of the CNAM SPA 62 and the CA SPA 66 may be distributed across a number of interconnected SCPs.

Figure 5:
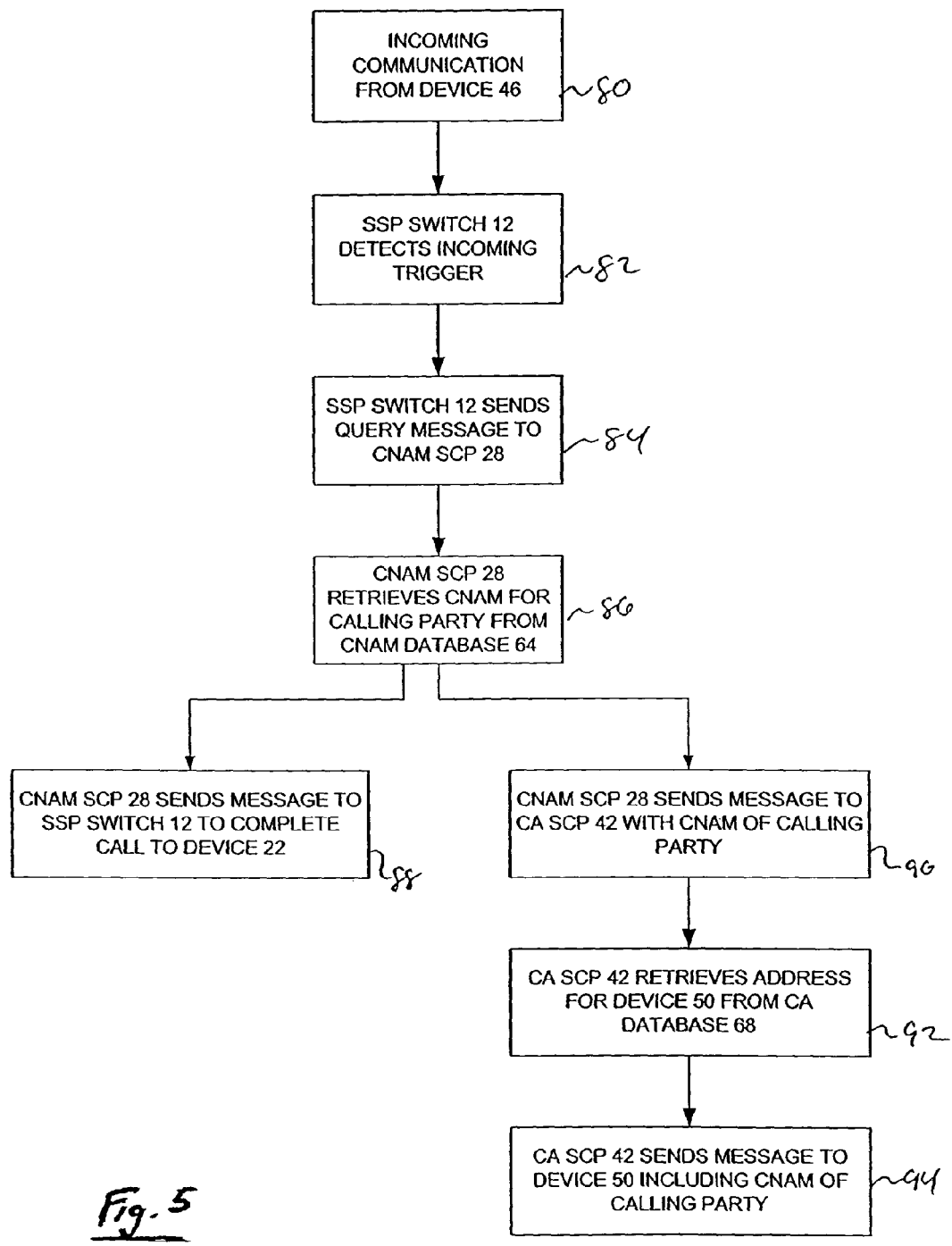
FIG. 5 is a block diagram of a process for providing a calling name service for an internet user for incoming communications to a remote telecommunications device using the system of FIG. 2 according to one embodiment of the present invention.

FIG. 5 is diagram illustrating a process for providing a calling name service to a subscriber for incoming communications to a remote telecommunications device associated with the subscriber using the system 40 according to one embodiment of the present invention. The process initiates at block 80 where a calling party places a communication to the subscriber at a telecommunications device that is associated with a data communications device that monitors incoming calls. For purposes of the system 40 illustrated in FIG. 2, the calling party may be a user of the telecommunications device 46, the incoming communication maybe placed to the telecommunications device 22, and the data communications device 50 may monitor the incoming communications to the telecommunications device 22.

From block 80 the process advances to block 82 where the SSP switch 12, provisioned with a terminating trigger specific to the service, detects the incoming communication. In response to detection of the terminating trigger, at block 84 the SSP switch 12 sends a query message to the CNAM SCP 28 via the STP 24. The query message from the SSP switch 12 to the CNAM SCP 28 maybe formatted according to the TR 118 query standard.

Having received the query message from the SSP switch 12, at block 86 the CNAM SCP 28 interrogates the CNAM database 64 to retrieve the directory number and/or calling name of the calling party (i.e., the directory number and calling name associated with the telecommunications device 46). From block 86 the process advances to block 88 where the CNAM SCP 28 sends a message to the SSP switch 12 to complete the incoming call from the telecommunications device 46 to the telecommunications device 22.

From block 86 the process also advances to block 90 where the CNAM SCP 28 sends a message to the CA SCP 42 via the STP 24 including the directory number/calling name of the calling party. From block 90 the process advances to block 92 where the CA SCP 42 interrogates the CA database 68 for the address of the device 50 associated with the called party (i.e., the telecommunications device 22). As discussed hereinbefore, the address of the device 50 may be, for example, a permanent IP address, such as where the communications link 54 is a cable modem link, an ADSL or an ISDN link, or it maybe a variable IP address for the device 50, such as where the communications link 52 is a dial-up connection.

Front block 92 the process advances to block 94 where the CA SCP 42 sends a message to the device 50 including the directory number/calling name of the calling party. The client call announcer module 70 may then optionally log and/or display the information on the display monitor of the device 50.

Figure 6:
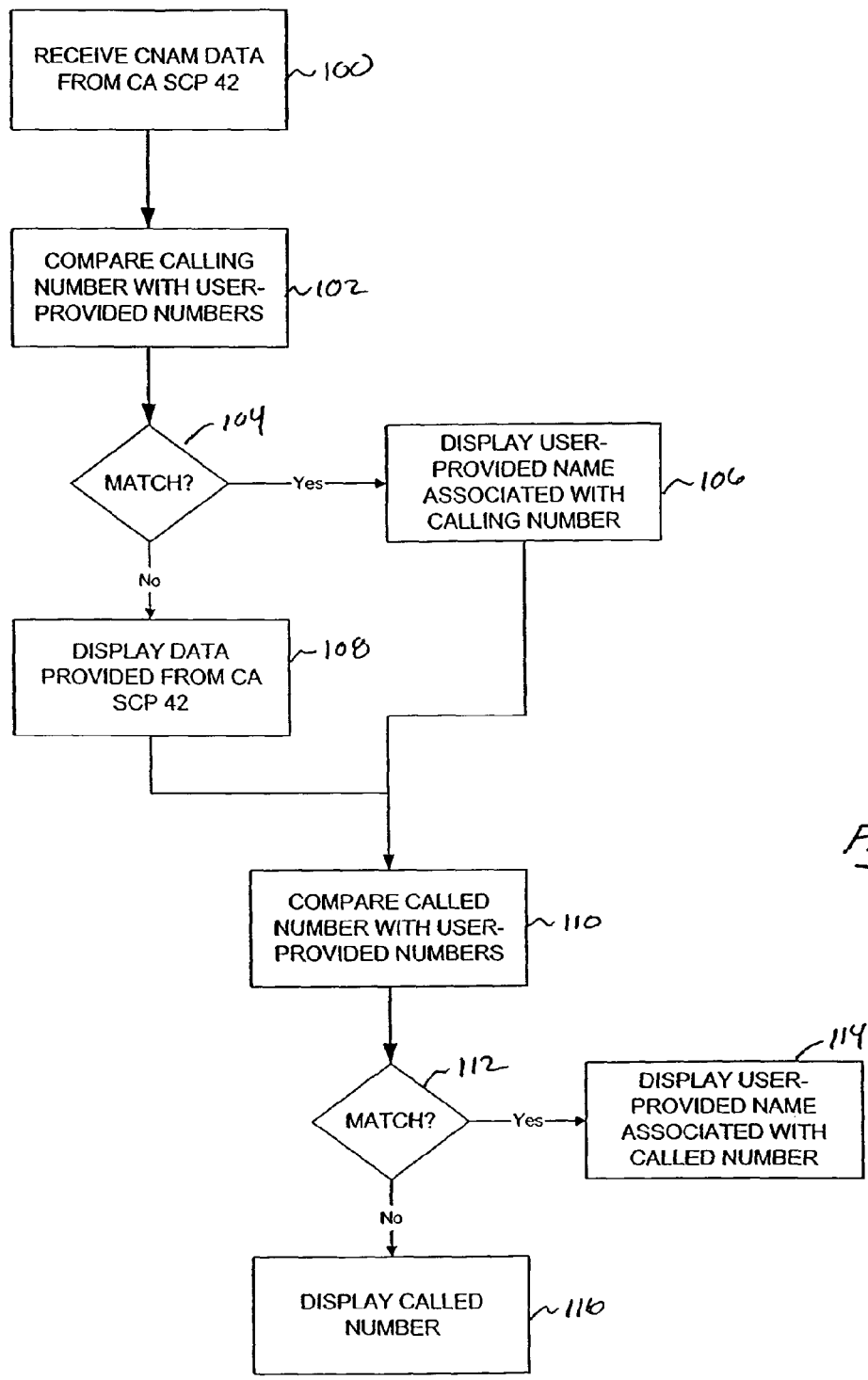
FIG. 6 is a diagram of the process flow through the client call announcer module according to one embodiment of the present invention.

FIG. 6 is a diagram of the process flow through the client call announcer module 70 according to one embodiment of the present invention. The process flow initiates at block 100, where the client call announcer module 70 receives the CNAM data (directory number and/or calling name) of the calling party via the network 52. From block 100 the process advances to block 102 where the client call announcer module 70 compares the calling number of the calling party (i.e., the directory number associated with the telecommunications device 46) with a subscriber-provided list of calling numbers. If at block 104 it is determined that there is match, the process advances to block 106 where the client call announcer module 70 displays the subscriber-provided name associated with the calling number. The subscriber-provided name may be different than the calling name stored in the CNAM database 64. Accordingly, the present invention permits a subscriber to personalize the displayed name for certain calling parties. Otherwise, if at block 104 it is determined that a match does not exist, the client call announcer module 70 displays the information provided by the CA SCP 42.

From either of blocks 106, 108 the process advances to block 110 where the client call announcer module 70 compares the called number (i.e., the directory number for the telecommunications device 22) with a subscriber-provided list of called numbers. If at block 112 it is determined that the called number matches one of the subscriber-provided numbers, the process flow advances to block 114 where the client call announcer module 70 displays the name associated with the called number. Accordingly, a user of the device 50 may monitor the incoming calls to a number of associated telecommunications devices such as, for example, separate home telephone lines, or a home telephone and a work telephone. Conversely, if at block 112 it is determined that the called number does not match one of the subscriber-provided numbers, the client call announcer module 70 may display the called number.

Figure 7:
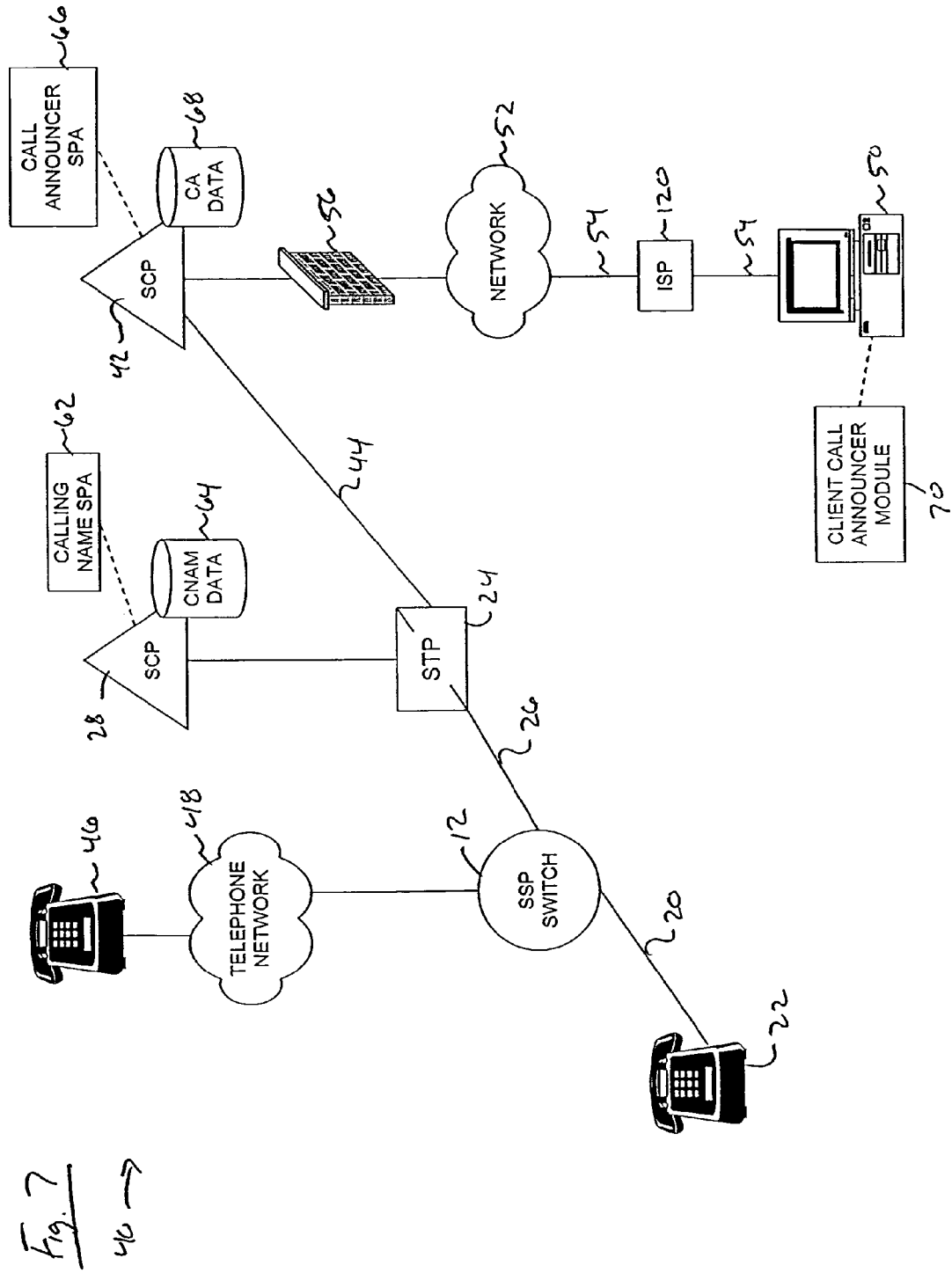
FIG. 7 is a block diagram of the system of FIG. 2 according to another embodiment of the present invention.

FIG. 7 is a block diagram of the system 40 according to another embodiment. The system 40 of FIG. 7 is similar to that of FIG. 2, except that an Internet Service Provider (ISP) 120 is shown as part of the connection between the data communications device 50 and the network 52. The ISP 120 may be an organization that provides access for the subscriber, via the device 50, to the network 52. According to such an embodiment, the ISP 120 may log incoming communications to the telecommunications device 22 based on messages from the CA SCP 42. The ISP 120 may then, for example, periodically send e-mail messages to the device 50 with the updated call log. Accordingly, incoming calls could be logged regardless of whether the device 50 was actively connected to the network 52. According to another embodiment, the ISP 120 may host a secure web site that the subscriber could access via the device 50 to retrieve the updated call log.

Although the present invention has been described herein with respect to certain embodiments, those of ordinary skill in the art will recognize that many modifications and variations of the present invention maybe implemented. The foregoing description and the following claims are intended to cover all such modification.

What is claimed is:

1. A method for notifying an Internet-accessible device of a communication placed from a first telecommunications device by a calling party to a second telecommunications device associated with a called party, the method comprising:
   detecting the communication;
   determining, via a first module in a node, information about the first telecommunication device associated with the calling party;
   determining, via a second module in a node, information about the Internet-accessible device, wherein the first module is accessed prior to the second module and wherein the first module and the second module are colocated within the node; and
   sending a notification message that includes information about the calling party to the Internet-accessible device via the Internet.

2. The method of claim 1, wherein detecting the communication includes detecting the communication at a switch.

3. The method of claim 1, wherein determining the information about the calling party includes determining a name associated with the calling party.

4. The method of claim 1, wherein determining the information about the calling party includes determining a directory number associated with the calling party.

5. The method of claim 1, wherein determining the information about the Internet-accessible device includes determining an Internet Protocol address of the Internet-accessible device.

6. The method of claim 5, wherein determining the Internet Protocol address of the Internet-accessible device includes determining a permanent Internet Protocol address.

7. The method of claim 5, wherein determining the Internet Protocol address of the Internet-accessible device includes determining a variable Internet Protocol address.

8. The method of claim 1, wherein sending the notification message includes generating the notification message.

9. The method of claim 1, wherein sending the notification message includes sending the notification message to the Internet-accessible device via a packet switched Internet Protocol network.

10. A computer-readable medium having stored thereon a set of instructions which, when executed by a processor, cause the processor to:

determine, via a first module in a node, information about a calling party that placed a communication to a telecommunication device;

determine, via a second module in a node, information about an Internet-accessible device associated with the called party, wherein the first module is accessed prior to the second module and wherein the first module and the second module are colocated within the node;

generate a notification message indicating that the called party placed a communication to the telecommunications device; and transmit the notification message to the Internet-accessible device via the Internet.

11. The computer-readable medium of claim 10, wherein the information determined about the calling party includes at least one of a name and a directory number associated with the calling party.

12. The computer-readable medium of claim 10, wherein the information determined about the Internet-accessible device includes an Internet Protocol address of the Internet-accessible device.

13. The computer-readable medium of claim 12, wherein the Internet Protocol address of the Internet-accessible device includes a permanent Internet Protocol address.

14. The computer-readable medium of claim 12, wherein the Internet Protocol address of the Internet-accessible device includes a variable Internet Protocol address.

15. The computer-readable medium of claim 10, wherein the notification message is transmitted to the Internet-accessible device via a packet switched Internet Protocol network.

16. A system for notifying an Internet-accessible device of a communication placed from a first telecommunications device to a second telecommunications device associated with the Internet-accessible device by a caller, the system comprising:

a first module within a node for determining information about the first telecommunications device associated with the caller responsive to detection of the communication; and a second module within the node for determining information about the Internet-accessible device, wherein the first module is accessed prior to the second module, wherein the first module and the second module are colocated within the node, and wherein a notification message that includes information about the calling party is sent to the Internet-accessible device via the Internet.

17. The system of claim 16, wherein at least one of the Internet-accessible device, the first telecommunications device and the second telecommunications device is a wireless device.

18. The system of claim 16, wherein the node is configured for communication with the Internet-accessible device via a packet-switched network.

19. The system of claim 16, wherein the information determined by the first module includes at least one of a name and a directory number associated with the caller.

20. The system of claim 16, wherein the information determined by the second module includes an Internet Protocol address of the Internet-accessible device.

* * * * *